United States Statutory Invention Registration [19]

[11] Reg. Number: H565

Ford et al. [43] Published: Jan. 3, 1989

[54] METHOD FOR MANUFACTURING THICK GLASS PHENOLIC LAMINATES

[75] Inventors: Edward J. Ford, Cupertino; Louis H. Dick, San Jose; Jose L. Camahort, Mountain View, all of Calif.

[73] Assignee: The United States of America as represented by the Secretary of the Navy, Washington, D.C.

[21] Appl. No.: 719,193

[22] Filed: Apr. 3, 1985

Related U.S. Application Data

[63] Continuation of Ser. No. 515,076, Jul. 18, 1983, abandoned.

[51] Int. Cl.[4] ..... B32B 31/00; B29C 45/00; B29C 47/00

[52] U.S. Cl. ..... 156/286; 156/335; 264/102; 264/511

[58] Field of Search ..... 156/285, 286, 289, 335, 156/382; 264/102, 101, 510, 511

[56] References Cited

U.S. PATENT DOCUMENTS

| | | | |
|---|---|---|---|
| 3,074,903 | 1/1963 | Fincke et al. | 156/335 X |
| 3,553,054 | 1/1971 | Maus | 156/382 |
| 3,666,600 | 5/1972 | Yoshino | 156/285 |
| 4,016,022 | 5/1977 | Browning et al. | 156/285 |
| 4,062,917 | 12/1977 | Hill et al. | 264/102 |
| 4,065,340 | 12/1977 | Dickerson | 156/286 X |
| 4,162,496 | 7/1979 | Downen et al. | 428/116 X |
| 4,264,671 | 4/1981 | Gillern et al. | 156/335 X |
| 4,311,661 | 1/1982 | Palmer | 264/510 |

*Primary Examiner*—John F. Terapane
*Assistant Examiner*—J. E. Thomas
*Attorney, Agent, or Firm*—C. D. B. Curry; W. C. Daubenspeck; K. S. Moss

[57] ABSTRACT

A vacuum bag autoclave type procedure for curing layers of phenolic resin impregnated fibrous material to form a composite structural part. A straight up heat rise cure cycle is employed in conjunction with a layup and bagging procedure that ensures a relatively free bleed of excess resin during cure and a high-capacity vacuum system for removal of volatiles generated during cure. This method of fabrication releases the majority of volatiles prior to gelation and produces a part having a pore structure that provides an escape path for gases generated during cure and postcure to prevent delamination.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MANUFACTURING THICK GLASS PHENOLIC LAMINATES

This application is a continuation of application Ser. No. 515,076, filed Jul. 18, 1983, now abandoned.

BACKGROUND OF THE INVENTION

1. Field of the Invention

This invention relates to a method of manufacturing laminates of composite materials and, more particularly, to a method of manufacturing thick laminates of phenolic resin based composite material by a vacuum-bag autoclave type cure process.

2. Description of the Prior Art

Phenolic resin based composites offer superior high temperature and environmental stability without imposing a high temperature cure requirement or the high cost of some other materials such as polyimides and polyquinoxalines. However, the fact that phenolic resins undergo cure with evolution of significant amounts of water has been a deterent to their more widespread use in aerospace applications where they may experience high temperatures in the range of 400°-500° F. A large percentage of phenolic laminates are produced in platen press type operations (compression molding) and involve comparatively thin panels. Platen press operations typically involve short cure cycles (high heating rates) at comparatively high platen pressure. Under these conditions the platen imposed pressure will counterbalance the vapor pressure of the water that is being generated inside the laminate, preventing delamination during the initial cure. Most of the products (e.g. circuit boards) need not withstand high temperatures and thus do not require high temperature postcure. If high-temperature postcure is required, the outgassing process is aided by the fact that with thin laminates any entrapped moisture can usually escape by a diffusional process, preventing the generation of a critical internal gas pressure that would induce delamination.

The fabrication of complex parts by compression molding necessitates the fabrication of costly dies. It is difficult to fabricate thick laminates that will withstand 450°-500° F. temperatures by compression molding because of difficulties in removing the entrapped moisture. The use of a vacuum-bag autoclave type cure process offers for better economy; however, heretofore thick phenolic laminates (60 ply, 0.5 inch or greater) suitable for use in high temperature applications have not been consistently producible by a vacuum-bag autoclave type cure process. Because phenolic resins undergo cure by elimination of water, there has been the widely held belief that, in order to minimize outgassing problems in cure, the preimpregnated fabric should have as low a volatiles content as is permissible within other constraints (e.g., tack and flow). For similar reasons, reliance was placed upon step-cure cycles with the assumption that intermediate temperature dwells were needed to effect outgassing. However, these measures, when applied to the autoclave cure of thick laminates, frequently produce laminates which delaminate during high-temperature post-cure.

SUMMARY OF THE INVENTION

It is an object of the present invention to provide an improved method of fabricating laminates of phenolic resin based composite material.

Another object is to provide a method of fabricating thick phenolic laminates suitable for use in high temperature applications.

A further object is to provide a method of fabricating thick phenolic laminates suitable for use in high temperature applications by a vacuum-bag autoclave type cure process.

Another object is to produce thick phenolic laminates that do not delaminate during cure or high temperature postcure.

These and other objects are accomplished by using a straight up heat rise cure cycle in a vacuum bag autoclave type cure procedure. The straight up heat rise cure cycle operates in conjunction with a layup and bagging procedure that ensures a relatively free bleed of excess resin during cure and a high-capacity vacuum system for effective removal of the volatiles generated during the cure. This method of fabrication releases the majority of the volatiles prior to gelation and produces a part having a pore structure that provides an escape path for gases generated during cure and postcure to prevent delamination. Parts manufactured using this process have consistently exceeded Mil-P-25515 mechanical property requirements.

Other advantages and features will become apparent from the following description of the preferred embodiment when considered in conjunction with the accompanying drawings wherein:

DESCRIPTION OF THE PREFERRED EMBODIMENT

Figure 1:
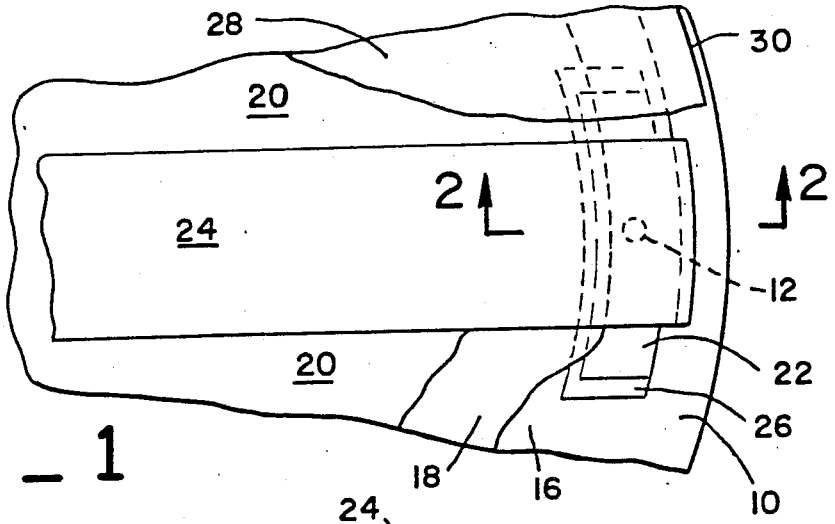
FIG. 1 is a partial plan cutaway view illustrating a typical layup and bagging procedure used in the present invention.

The preferred embodiment will be described with respect to the use of the present invention for fabricating phenolic resin based composite laminates using a phenolic resin manufactured by Monsanto under the code SC-1008 and A-1100 soft-finish glass fabric supplied by Clark Schwabel or United Merchants. However, a person skilled in the art will recognize that the teachings of the present invention have immediate application to the broad class of phenolic resins and the production of phenolic resin based laminates.

The Monsanto SC-1008 resin (hereinafter referred to as resin), according to the manufacturer is hexamethylenetetramine catalyzed one-stage resole resin. This type of resin typically is produced by heating phenol with formaldehyde in the presence of hexamethylenetetramine (A-staging), a process that produces a complex mixture of condensation products ranging from monomeric phenol alcohols to oligomeric amine adducts. Subsequent to the initial condensation reaction, which may be carried out in water as a reaction medium, the mixture is heated under vacuum to 50°-70° C. to drive off water and excess phenol, whereupon the stripped resin is dissolved in a suitable solvent, typically isopropyl alcohol (IPA). The prepregger uses the resin solution in the "as-received" form, or subsequent to further dilution with ethyl alcohol, but typically without further addition of cure catalysts.

To produce the prepreg, the glass fabric is passed through a trough containing the resin solution and from there past some stripper bars to remove excess resin and then through the drying towers. While passing through the towers, typically at speeds of one to several feet per minute, the impregnated cloth is stripped of solvent. Concurrently, the exposure of the resin to the hot air stream causes partial polymerization (B-staging). To control the degree of B-staging, the prepregger must properly select and control feed rate, air flow and air temperature. The resin content of the prepreg is controlled by adjusting the solids content of the resin solution, and by mechanical factors such as tension exerted by the rollers and feed rates.

The extent of partial polymerization in the prepreg is an important parameter in the manufacture of laminates and is especially important in the manufacture of thick laminates. In the manufacture of thick parts which require some contour in the part, the need for contour dictates a requirement for drape and tack in the prepreg. This requirement is best satisfied by a low B-staged, "green", prepreg which has undergone very little molecular change in the prepreg manufacture.

The volatile content of the prepreg has at times been used as an approximate measure of the degree of resin advancement. Recently developed liquid chromatography and viscosity measurements using dielectric cure monitoring techniques provide much more accurate determination of resin advancement. By employing these new techniques, it has been determined that thick 0.5 inch or greater laminates produced in the vacuum bag autoclave process are likely to delaminate during cure or high temperature post cure when (1) the resin was more highly advanced than indicated by the "volatiles content" of the prepreg and (2) a conventional step cure cycle employihg temperature dwells at intermediate temperatures before reaching the final cure temperature was used. Less advanced resins were less likely to delaminate when fabricated by the step cure process. As a result, when a step-cure cycle is employed, the permissible range of resin advancement is limited.

The volatiles generated during cure (and post cure) of phenolic composites must be releasable throughout the curing process. Since additional cross-linking occurs every time the laminate is heated to a higher temperature, newly generated volatiles must be releasable to assure that trapped volatiles will not cause the part to delaminate. In the present invention, control of the volatile release during cure and post cure, without delamination, is accomplished by using a straight up heat rise cure cycle in conjunction with measures to ensure a relatively free bleed of excess resin during cure and a high-capacity vacuum system for effective removal of the volatiles generated during the cure. This method of fabrication produces a part having a communicating pore structure which provides an escape path for the gases generated during cure and postcure. Thick laminates capable of withstanding high temperature post cure may be produced with phenolic resins which would be subject to delamination if fabricated in a step cure cycle.

Figure 2:
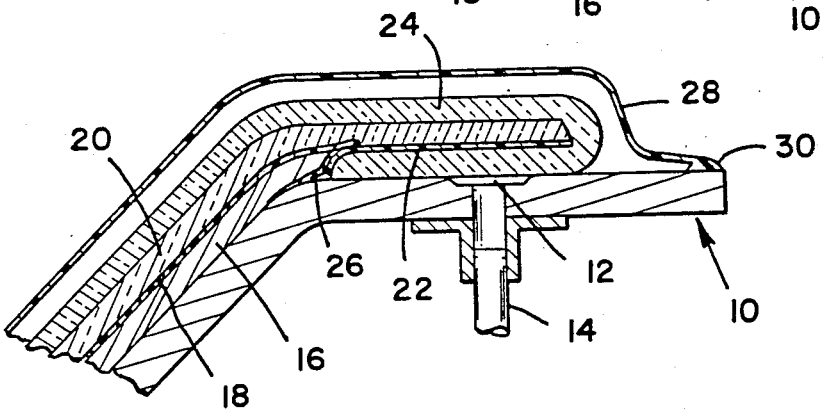
FIG. 2 is a partial sectional view taken along line 2—2 in FIG. 1.

Referring now to the drawings, FIGS. 1 and 2 illustrate the bagging procedure employed in the autoclave layup and cure of phenolic laminates employed in the present invention to obtain a free bleed and a path for volatiles to reach all vacuum ports on the tool. The autoclave is not shown in the partial views. FIGS. 1 and 2 show a portion of a metal layup tool 10 having a vacuum port 12 coupled to a vacuum line 14. The layup tool 10 has a plurality of vacuum ports 12 and associated vacuum lines 14 disposed about the tool in order to maintain a good vacuum over the entire part. There should be sufficient vacuum ports to accomodate the maximum volatile flow rate. The layers of prepreg 16 are laid onto the tool IO. The layers of prepreg I6, which are generally in either tape or woven fabric form, are oriented according to conventional techniques to provide the desired structural properties and the desired thickness.

A porous, teflon-coated fabric layer I8 is disposed on the prepreg laminate 16 to act as a screen which allows excess phenolic resin to pass from the prepreg laminate to a bleeder blanket 20. The porous teflon layer 18 also acts as a release agent to allow the bleeder blanket 20 to be pulled off the cured part and discarded. The bleeder blanket 20, which consists of a multiplicity of layers of fabric, acts as a blotter to absorb the excess resin in the laminate 16. An excess of blotter fabric is needed to assure free bleed (i.e., the blotter must not become saturated).

A barrier film 22 is provided to prevent any resin which may have been absorbed by the bleeder blanket 20 from entering the vacuum port 12. The barrier film 22 is sealed to the tool 10 on three sides with masking tape 26. A bleeder strip 24 is disposed between the vacuum port I2 and the barrier film 22 extends around the end of the bleeder blanket 20 and onto the surface of the layup. The bleeder strip 24 which has a plurality of layers, acts as a conduit to pull the volatiles such as solvent and steam out of the part during cure. The masking tape 26 is used at each vacuum port to inhibit the flow of resin from the laminate 16 into the bleeder strip 24 where the resin may impede the flow of volatiles through the vacuum port 12. A vacuum bag 28 sealed at 30 is disposed over the layup.

After the bagging of the prepreg material and the various other layers in the autoclave, the part is cured according to the following procedure. A good vacuum, preferrably at least 22 inches Hg, is applied and maintained during the entire cure cycle. The autoclave may be pressurized if desired according to well-known principles. The part is then heated rapidly at a rate of at least 1° F. per minute until the desired maximum cure temperature is reached and maintained for the desired period. A preferred method is to heat the part at the maximum rate capability of the autoclave to the desired cure temperature. Of course, the outside of the part must not be heated beyond the maximum cure temperature in an effort to increase the heating rate of the part. The objective is to provide a rapid heat rise in the entire layup; the ideal heating method would be to heat the part from the inside out. In the cure of the specific phenolic resin described herein, the preferred cure calls for heating the part at 1° F. to 6° F. per minute to 300° F.±IO° F. and hold for 90 minutes.

After the desired period of cure with the part at the maximum cure temperature, the part is cooled to 150° F. or lower at a rate of 2° F. or less per minute to avoid residual stress in the part. Any autoclave pressure is preferably maintained until the cool down reaches at least 150° F. The vacuum is maintained until the part leaves the autoclave.

In the case of a part which is expected to experience high temperatures when used on an aerospace vehicle, the laminated part undergoes a post cure cycle in an oven. A typical post cure cycle consists of:

1. Six hours±1 hour at 200° F.±1O° F.
2. Ten hours±1 hour at 250° F.±10° F.
3. Ten hours±1 hour at 300° F.±10° F.
4. Ten hours±1 hour at 350° F.±10° F.
5. Eight hours±1 hour at 400° F.±10° F.
6. Eight hours±1 hour at 450° F.±1O° F.

In the straight up heat rise cure cycle of the present invention, the major release of volatiles occurs prior to gelation. However, as noted earlier, additional volatiles continue to be generated after gelation whenever additional cross-linking occurs where the laminated part is subjected to higher temperatures. Laminated parts produced by the straight up heat rise method have a communicating pore structure without microcracking which allows release of volatiles in the post gelation period. Porosity is generally thought to be an undesirable characteristic which lowers the physical properties of the laminate. However, laminates capable of withstanding high temperatures are characterized by the porosimetry shown in FIGS. 3 and 5. A differential porosity peak is required in the open pore diameter range of approximately 70 to 10 microns to successfully fabricate parts which will not delaminate in either cure or post cure. This peak can be obtained with a step cure process only if the prepreg has low to no B-staging. The use of a straight up heat rise cure mitigates the relative importance of B-staging control.

Figure 3A:
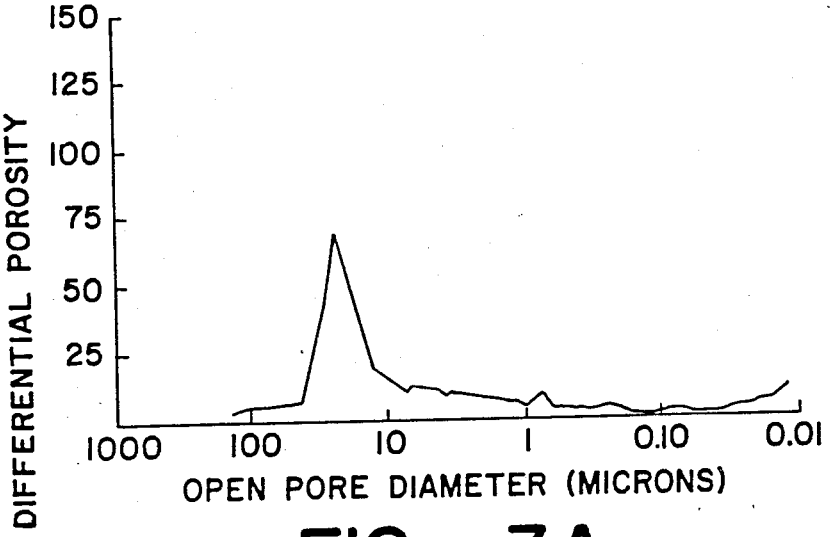
FIGS. 3, 4 and 5 are graphs comparing the porosimetry of parts fabricated according to the present invention with that of parts fabricated by the step cure method.
Figure 3B:
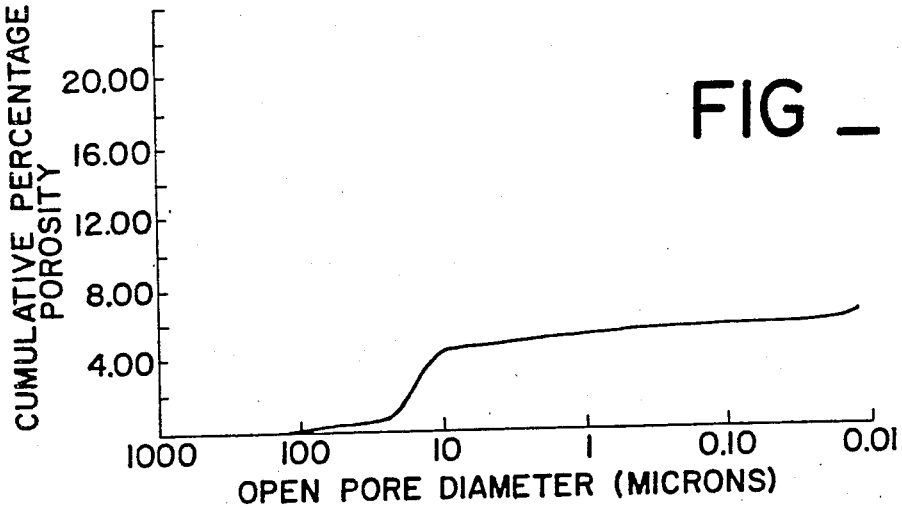
Figure 4A:
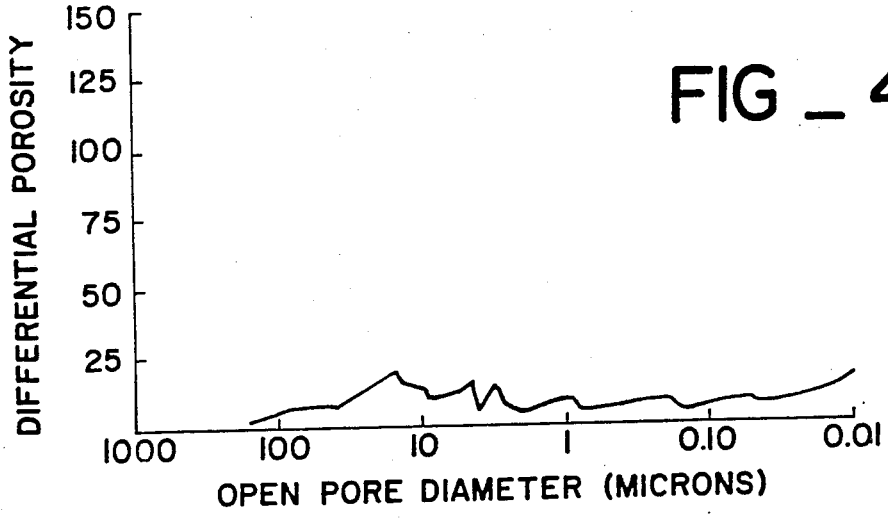
Figure 4B:
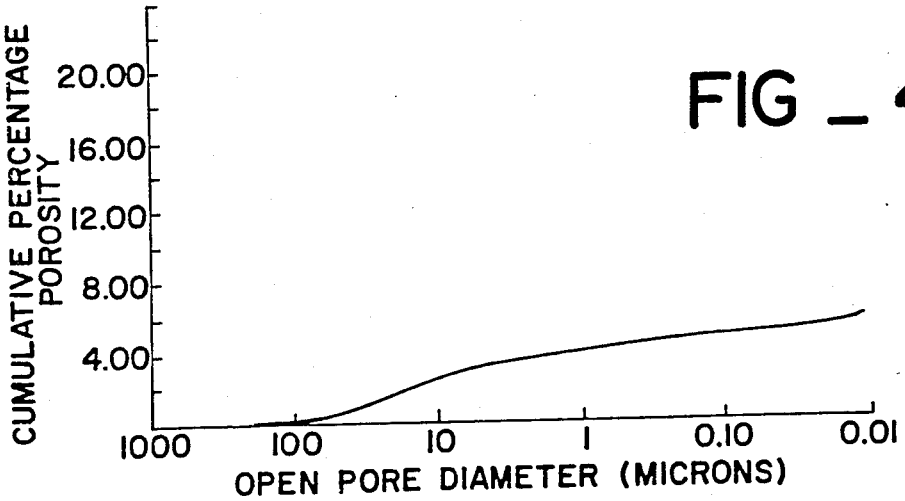
Figure 5A:
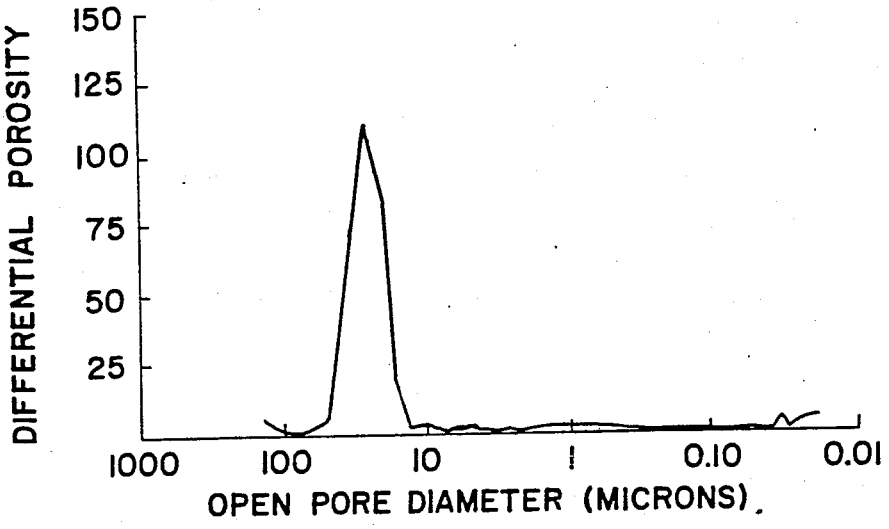
Figure 5B:
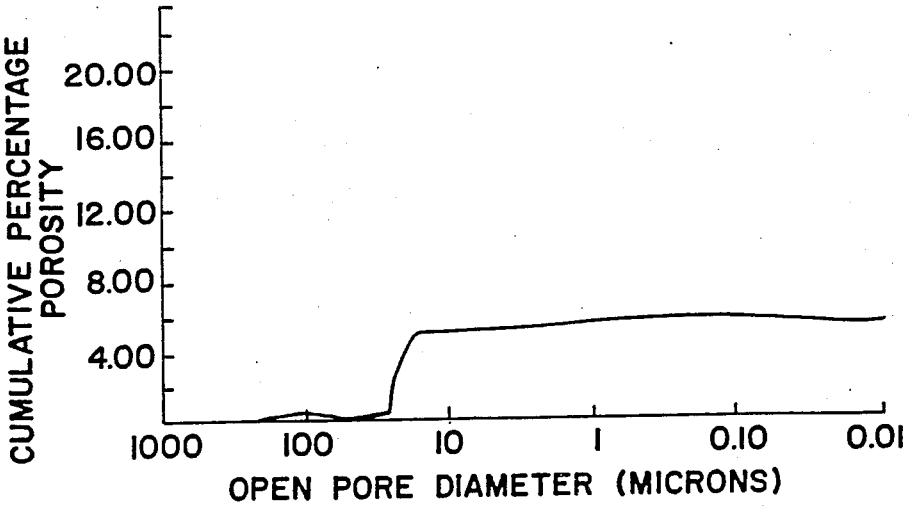

FIGS. 3A and 3B show the porosimetry of a part fabricated according to the present invention that successfully passed the high temperature post cure using highly B-staged material. FIGS. 4A and 4B show the porosimetry of a part that delaminated during post cure which was fabricated from the same prepreg batch following a conventional step cure cycle. The laminates produced by both processes had a pore volume of from 5–7 percent. However, the part produced according to the present invention has a pore diameter predominantly in the 70 to 10 micron range whereas the part which delaminated does not exhibit this predominant pore diameter. FIGS. 5A and 5B show a part successfully fabricated with step cure and very low B-staging (green material). The differential porosity shown in FIGS. 3 and 5 are typical of parts that successfully pass high temperature post cure, whether cured by step cure or according to the present method.

By relying on the present method, it has been possible to process 100 ply-laminates that successfully passed the post cure, and to accomplish this using a prepreg batch that consistently caused delamination failures when processed under step-cure conditions. Similarly, it has been possible to process 15-ply laminates that, subsequent to the 300° F. autoclave cure, suffered only a 0.25 percent weight loss during 450° F. post cure. This is indicative of a high state of cure, and it compares favorably with other high temperature systems that typically require higher cure temperatures for attaining this level of thermal stability.

The vacuum-bag autoclave straight up heat rise cure method is applicable to any prepreg material (e.g. fiberglass, Kevlar, graphite, etc.) which uses phenolic base resins. It is especially applicable where relatively thick parts are desired, e.g., 0.25 inches or greater, and the alternative methods such as compression molding are not satisfactory. Parts requiring extreme thickness, e.g. greater that 1 or 2 inches, can be fabricated using the straight up heat rise and co-curing principles.

Obviously many modifications and variations of the present invention are possible in the light of the above teachings. It is therefore to be understood that within the scope of the appended claims the invention may be practiced otherwise than as specifically described.

What is claimed is:

1. A vacuum bag autoclave process for manufacturing thick laminated structural parts, said-parts having 60 or more layers making said part 0.5 inch or greater in thickness, said parts being formed entirely from layers of phenolic resin impregnated fibrous material, said process allowing the formation of parts of up to 100 layers in thickness which are capable of withstanding a post cure temperature of 450° F. without delamination, said process allowing the formation of said structural parts from phenolic resin impregnated fibrous material having a wide range of resin advancement, which process comprises:

(a) stacking layers of said resin impregnated fibrous material to a desired thickness on a layup surface providing the contour for the part;

(b) curing said stacked layers into a unitary structure by heating said stacked layers at 1° F. per minute or greater until the maximum cure temperature for a prescribed period while simultaneously (1) maintaining said stacked layers under a vacuum;

(2) providing means for absorbing excess resin released from said stacked layers during said step of curing; and (3) providing means for evacuating volatiles generated by said stacked layers during said step of curing; and (c) cooling the cured structure to at least 150° F. while maintaining the vacuum.

2. A process as recited in claim 1 wherein said step of stacking layers of said resin impregnated fibrous material to a desired thickness comprises stacking 15 to 100 layers of said resin impregnated fibrous material to a desired thickness on a layup surface providing contour for the part.

3. A method as recited in claim 2 wherein said step of providing means for absorbing excess resin comprises:

(a) disposing a release layer on the surface of said stacked layers, said release layer being porous to said resin; and (b) disposing bleeder blanket on the surface of said release layer to absorb excess resin released from said stacked layers during said step of curing, said bleeder blanket being capable of absorbing all of said excess resin without saturating; and wherein said step of providing means for evacuating volatiles comprises:

(a) providing sufficient vacuum ports to accommodate the maximum flow of volatiles generated by said stacked layers during said step of curing; and (b) disposing bleeder material to provide a means for conducting said volatiles to said vacuum ports; and (c) providing a barrier layer between said bleeder blanket and said bleeder material to prevent resin from entering said vacuum ports.

4. A process as recited in claim 1 wherein said process further comprises post curing said cured structure by heating said cured structure in a series of steps of increasing temperature to a final post cure step at a temperature of approximately 450° F. or greater.

5. A process as recited in claim 4 wherein said step of stacking layers of said resin impregnated fibrous material to a desired thickness comprises stacking 60 to 100 layers of said resin impregnated fibrous material to a desired thickness on a layup surface providing contour for the part.

6. A process as recited in claim 5 wherein each step of said post cure has a temperature dwell of several hours.

7. A method as recited in claim 6 wherein said step of providing means for absorbing excess resin comprises:

(a) disposing a release layer on the surface of stacked layers, said release layer being porous to said resin; and (b) disposing bleeder blanket on the surface of said release layer to absorb excess resin released from said stacked layers during said step of curing, said bleeder blanket being capable of absorbing all of said excess resin witout saturating; and wherein said step of providing means for evacuating volatiles comprises:

(a) providing sufficient vacuum ports to accommodate the maximum flow of volatiles generated by said stacked layers during said step of curing; and (b) disposing bleeder material to provide a means for conducting said volatiles to said vacuum ports; and wherein said step of providing means for evacuating volatiles comprises:

(a) providing sufficient vacuum ports to accommodate the maximum flow of volatiles generated by said stacked layers during said step of curing; and (b) disposing bleeder material to provide a means for conducting said volatiles to said vacuum ports; and (c) providing a barrier layer between said bleeder blanket and said bleeder material to prevent resin from entering said vacuum ports.

8. A process as recited in claim 1 wherein said process further comprises post curing said cured structure by heating said cured structure in a series of steps of increasing temperature to a final post cure step at a temperature of approximately 450° F. or greater.

9. A curing process for structural laminates which incorporate thick phenolic sections of 60 to 100 contiguous layers of phenolic resin impregnated fibrous material, said phenolic sections being capable of withstanding a post cure temperature of 450° F. without delamination and being formed from phenolic resin impregnated fibrous material having a wide range of resin advancement, which comprises:

(a) stacking the layers of said laminate to a layup surface providing the contour for the part;

(b) curing said stacked layers into a unitary structure by heating said stacked layers at 1° F. per minute or greater until the maximum cure temperature is reached and maintaining the maximum cure temperature for a prescribed period while simultaneously (1) maintaining said stacked layers under a vacuum;

(2) providing means for absorbing excess resin released from said stacked layers during said step of curing; and (3) providing means for evacuating volatiles generated by said stacked layers during said step of curing; and (c) cooling the cured structure to at least 150° F. while maintaining the vacuum.

* * * * *